June 22, 1937.  F. W. PRESTON  2,084,653
HYDRAULIC TESTING MACHINE
Filed June 17, 1935  4 Sheets-Sheet 2

INVENTOR
Frank W. Preston,
By Archworth Martin,
Attorney.

June 22, 1937.  F. W. PRESTON  2,084,653
HYDRAULIC TESTING MACHINE
Filed June 17, 1935   4 Sheets-Sheet 3

INVENTOR
Frank W. Preston,
By Archworth Martin
Attorney.

June 22, 1937.　　　F. W. PRESTON　　　2,084,653
HYDRAULIC TESTING MACHINE
Filed June 17, 1935　　　4 Sheets-Sheet 4
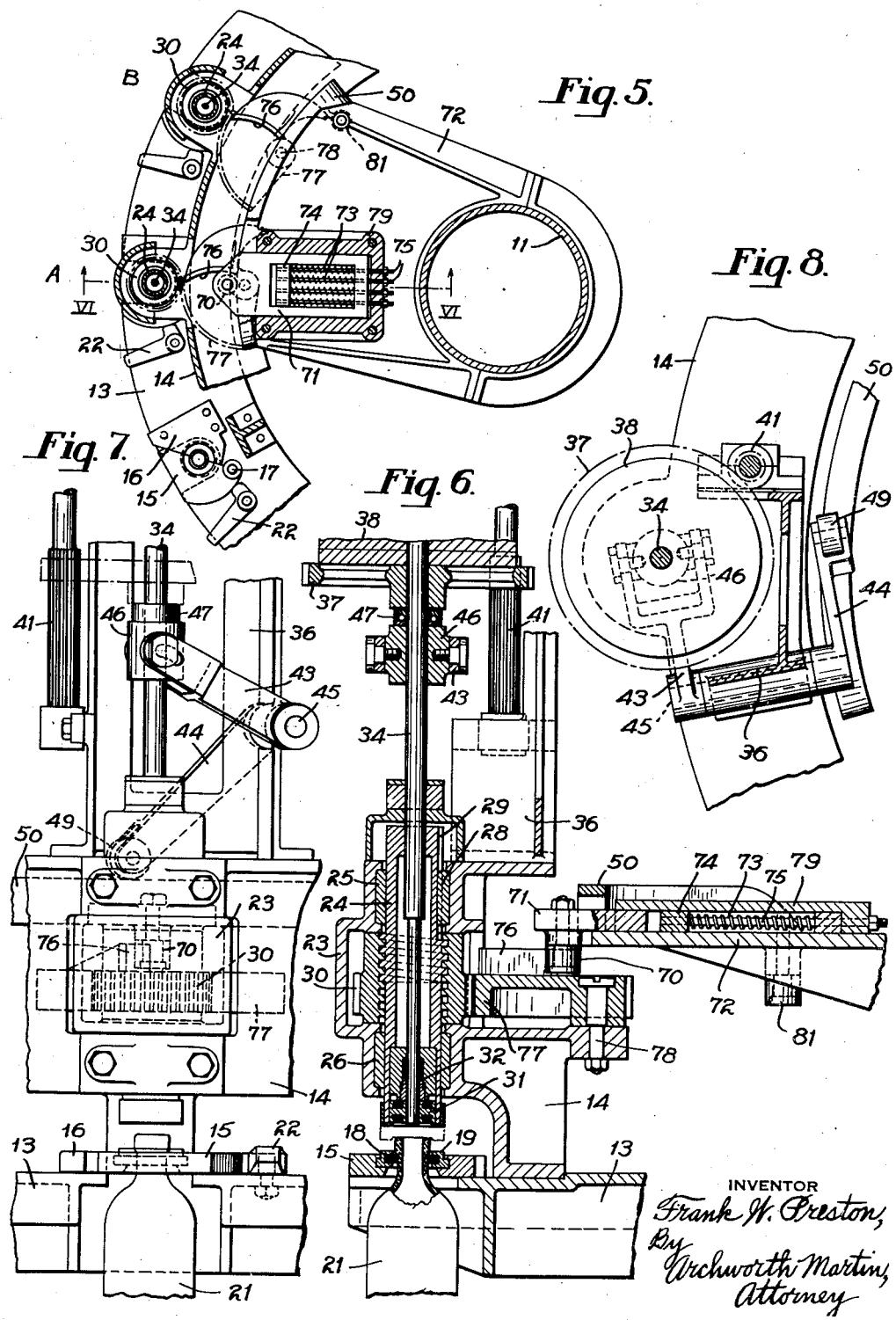
INVENTOR
Frank W. Preston,
By Archworth Martin,
Attorney Patented June 22, 1937

2,084,653

UNITED STATES PATENT OFFICE 2,084,653

HYDRAULIC TESTING MACHINE

Frank W. Preston, Butler, Pa.

Application June 17, 1935, Serial No. 26,991

13 Claims. (Cl. 73—51)

My invention relates to hydraulic testing machines and more particularly to apparatus for submitting glass bottles and other hollow articles to internally-applied fluid pressures for the purpose of determining the strength thereof. The present application constitutes an improvement upon the disclosure of my Patent No. 2,048,027 issued July 21, 1936.

One object of my invention is to provide a hydraulic testing machine that is mainly automatic in its operation, and which will subject individual articles to uniform testing pressures over desired uniform periods of time.

Another object of my invention is to provide apparatus for testing a plurality of articles simultaneously, each article being individually subjected to test independently of the others.

A further object of my invention is to provide a testing machine of the character referred to which is of simple form and of great accuracy and efficiency in operation.

Figure 1:
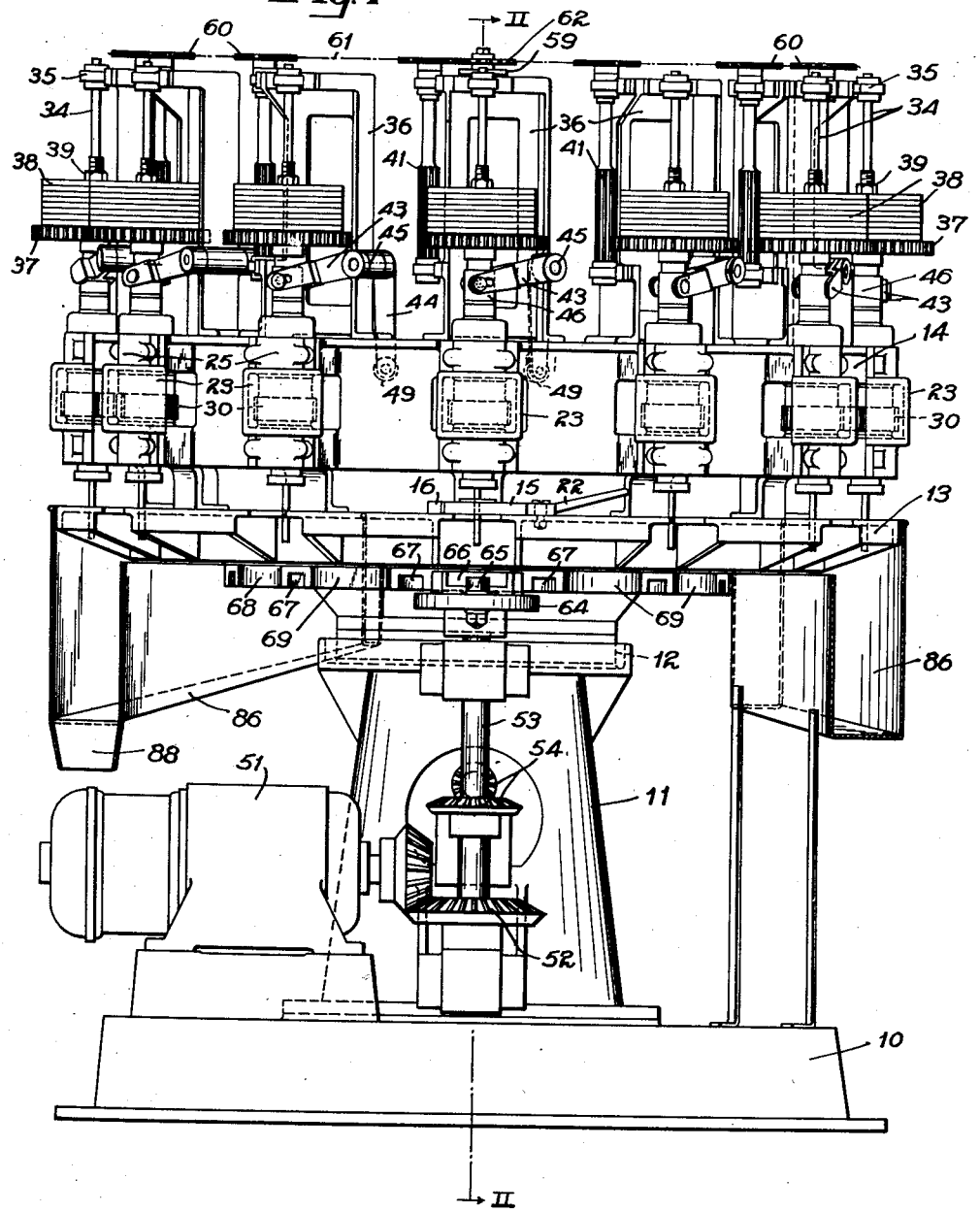
Figure 2:
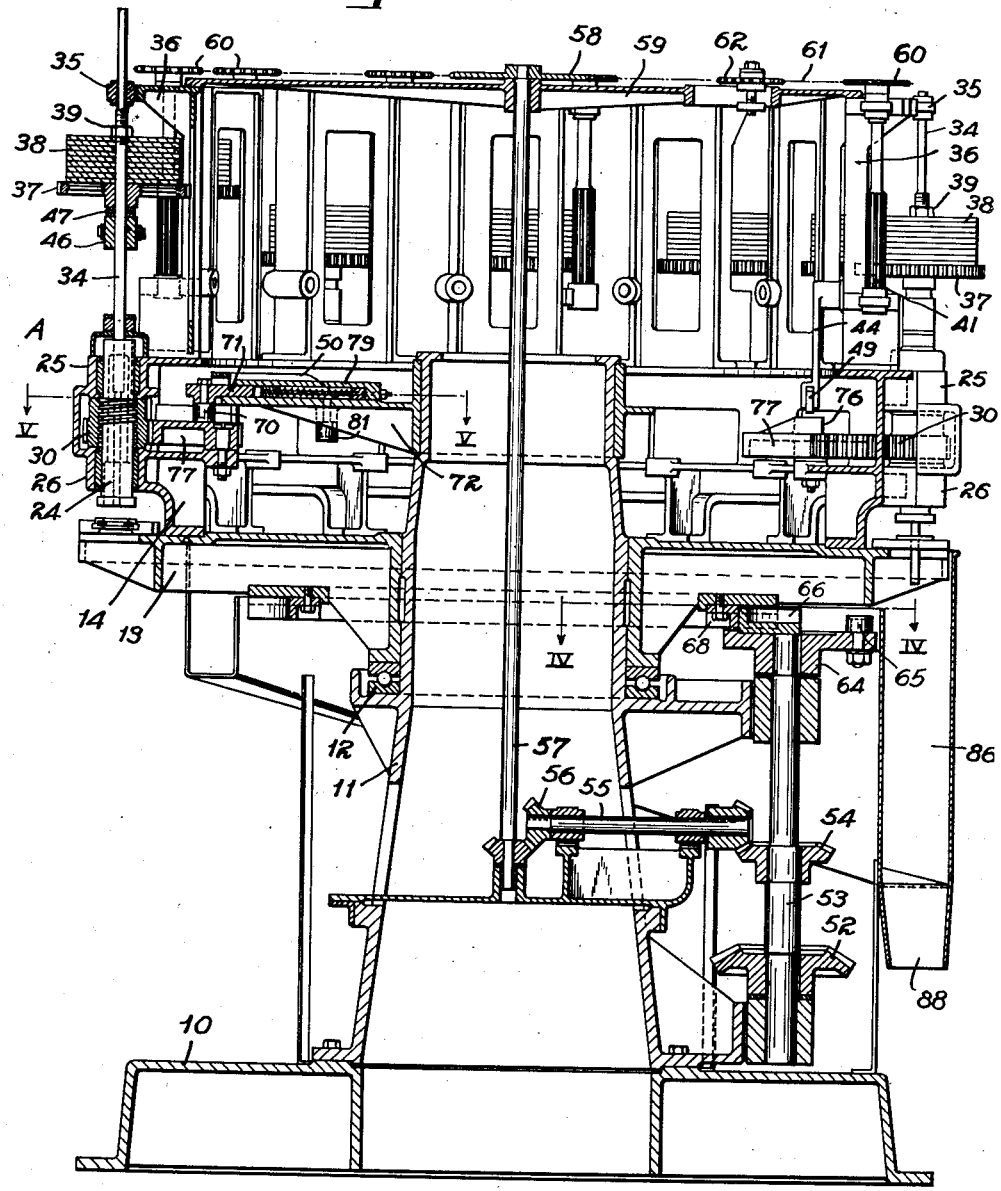
Figure 3:
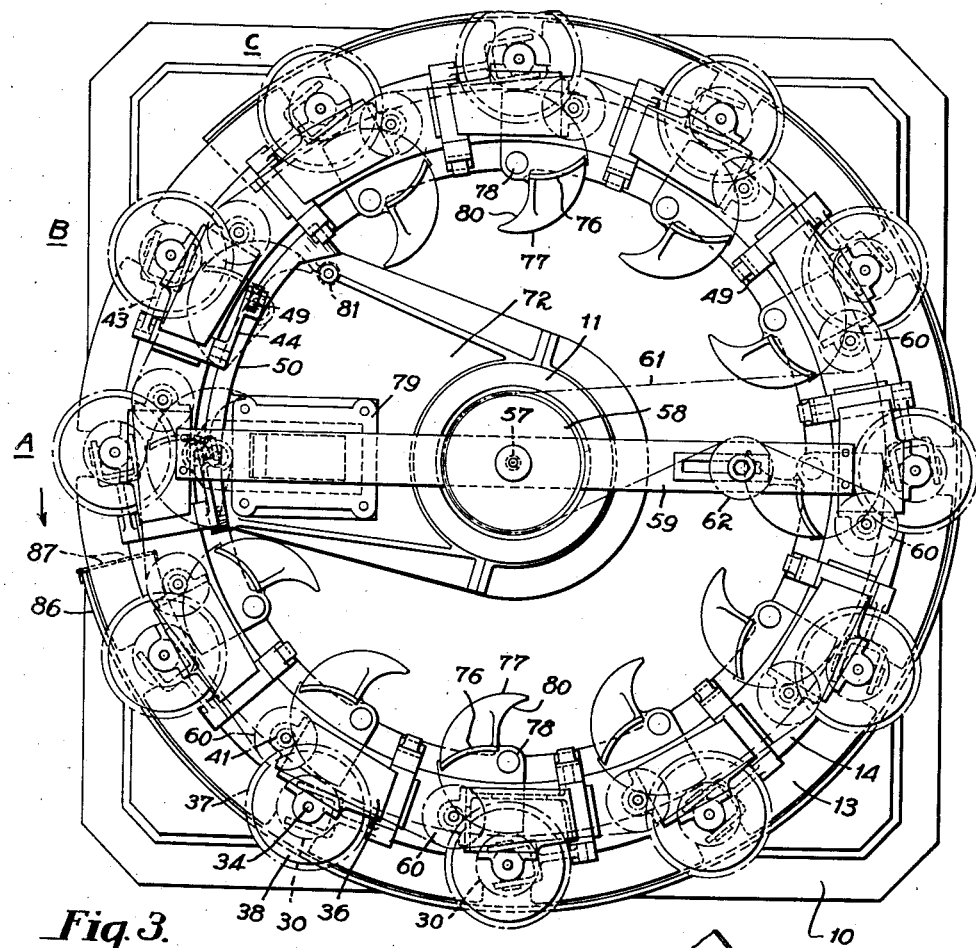
Figure 4:
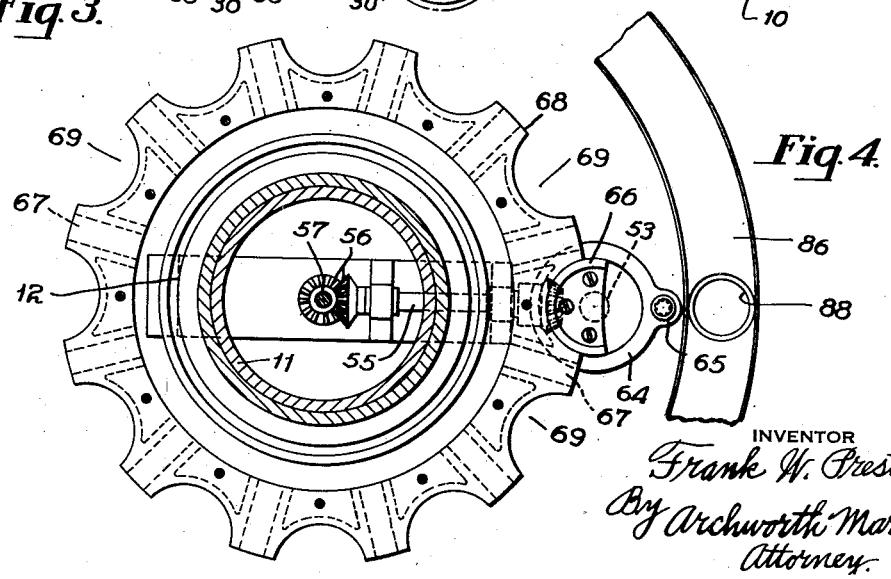

Referring now to the accompanying drawings, Figure 1 is an elevational view of the machine; Fig. 2 is a view taken on the line II—II of Fig. 1; Fig. 3 is a plan view of the machine; Fig. 4 is a sectional plan view taken on the line IV—IV of Fig. 2; Fig. 5 is a view taken on the line V—V of Fig. 2; Fig. 6 is a vertical sectional view, on an enlarged scale, taken on the line VI—VI of Fig. 5; Fig. 7 is a face view of the structure of Fig. 6, and Fig. 8 is a sectional plan view through the apparatus of Fig. 6.

The apparatus is shown as provided with a base 10 upon which is mounted a stationary column 11 that is provided with an annular flange for supporting an anti-friction bearing 12 that in turn rotatably supports a table or carrier 13. The table 13 carries a ring casting 14 upon which twelve individual testing units are mounted, the said units being of the general form shown in my said application, and which may be briefly described in detail as follows:—

The units are shown more clearly in Figs. 6, 7, and 8. Clamping jaws 15 and 16 are mounted on the table 13 (Fig. 5), the jaw 16 being rigidly bolted thereto and the jaw 15 pivotally connected to the table on a pin 17, it being understood that these clamping jaws are removable to permit the substitution of other jaws of different radius which will fit bottle necks of various diameters. The clamping jaws each carries a metallic bushing 18 in which is placed a yieldable bushing 19 of rubber or the like, for the purpose of gripping the neck of a bottle 21. The jaw 15 is held in closed or gripping position by means of a cam lever 22, which when swung in a counter-clockwise direction as viewed in Fig. 5, will permit the jaw 15 to be swung open and release the bottle.

Each testing unit includes a quill 24 of generally tubular form that is supported for limited vertical movement in bearings 25 and 26 that are formed in the ring casting 14 and a bearing cap 23. The quill 24 is held against rotation in its bearings by means of a key member 28 that extends into a slot or keyway 29.

The raising and lowering movement of the quill is effected by means of a gear nut 30 that is journalled on and has threaded engagement with the periphery of the quill, and is disposed between the bearings 25 and 26. A gear segment 77 is journalled at 78 on the ring casting 14 and meshes with the gear nut 30. The gear segment 77 is rotated or oscillated in a manner to be hereinafter described.

When the nut 30 is turned to effect lowering movement of the quill, a seal is thereby effected with the top of the bottle, as shown in broken lines in Fig. 6. For this purpose, the quill has a sealing ring 31 mounted in its lower end, which ring has rubber packing on its upper and lower surfaces. A stuffing box 32 is also mounted in the quill to prevent leakage of water upwardly therethrough past a plunger 34. When a bottle filled with water has been placed between the jaws 15 and 16, the quill is automatically lowered, and at a take-out station to be hereinafter described, the quill is automatically raised to permit removal of the bottle. The water in the bottle is subjected to pressure by means of the plunger 34 which is raised and lowered, while the quill is in sealing position on the bottle. This plunger has vertical sliding movements in the quill, and is guided at its upper end by a bearing 35 which is secured to a bracket or housing 36, that is bolted to the ring casting 14.

A gear wheel 37 is secured to the plunger 34 and a series of weights 38 may be slid into place upon the gear wheel, the number of weights employed depending upon the degree of pressure which it is desired to exert within the bottles. A nut 39 serves to prevent the weights 38 from being jarred out of place. A wide-faced pinion 41 is journalled in the bracket 36 and has driving engagement with the gear wheel 37 to effect rotation of the plunger 34, so that there will be a minimum of binding action on said plunger during raising and lowering movements thereof, with respect to the quill 24 and the packing elements therein. The plunger is raised and lowered by a pair of crank arms 43 and 44 that are secured to a shaft 45 which is journalled in the bracket 36. The arm 43 has pivoted engagement with a yoke or crosshead 46 that surrounds the plunger 34, the connection between the arm 43 and such yoke being effected by the use of a pin and slot, as shown more clearly in Fig. 7. An anti-friction bearing 47 is interposed between the yoke 46 and the gear wheel 37, so as to reduce friction between the gear wheel and the yoke when the yoke is at such height as to support the gear wheel and the plunger.

The arm 44 carries a roller 49 which, at the charging and take-out stations, has engagement with a cam track 50 that effects raising of the lower end of the arm 44, and consequent elevation of the yoke 46, and the plunger 34, so that the bottles can be inserted and removed at such stations.

As shown more clearly in Figs. 1 and 2, a driving motor and speed reducer unit 51 is provided, which through beveled gearing 52, drives a vertical shaft 53. The shaft 53, through beveled gearing 54, horizontal shaft 55, and beveled gearing 56 drives a shaft 57, which at its upper end carries a sprocket 58.

These driving connections are all supported on the fixed portions 10 and 11 of the apparatus, the upper end of the shaft 57 being journalled in a cross bar 59 that is secured at its ends to two of the housings 36.

Each wide-faced pinion shaft 41 carries at its upper end a sprocket wheel 60. As shown more clearly in Fig. 3, a drive chain 61 extends around the sprocket wheel 58, and peripherally of the sprocket wheels 60. An idler sprocket 62 is adjustably positioned in the cross bar 59 and serves as a tensioning or slack take-up device for the chain. The sprocket 58 is constantly driven, and therefore constantly rotates the wide-faced pinions 41, and the various plungers 34, since the gear wheels 37 will have unbroken driving engagement with the pinions 41.

The table 13 is intermittently driven by a Geneva type drive. Driving connections are from the motor 51 through the shaft 53 to a Geneva pinion 64 that carries a roller 65 which serves as a driving tooth and a stop plate or segment 66 which holds the table 13 against rotation. The element 65 is periodically brought into driving engagement with the radially-slotted portions 67 of a Geneva gear wheel 68, that is secured to the underside of the table 13, to periodically impart a one-step movement to the table. The element 66, during the time that the roller 65 is out of engagement with the gear wheel, engages curved recesses 69 in the Geneva gear element 68, so as to hold the table against idling movement. Since there are twelve testing units on the table, the table is given twelve steps of movement in each complete rotation thereof. During pauses of movement, the operator will insert a bottle filled with water at the charging station A (Fig. 3), and remove a tested bottle at the take-out station B.

At station A, the operator will insert a bottle filled with water between the jaws 15 and 16. During the succeeding one-step movement of the table that particular testing unit will be carried past a pin 70 that is carried by a slide plate 71. The slide plate 71 is radially slidable on a bracket 72 that is carried by the column 11, and the slide is yieldably urged toward the center of the column by means of springs 73. The springs seat at one end against a block 74 that is carried by rods 75 which are longitudinally adjustable in a cover block 79 secured to the bracket 72, the inner ends of the springs bearing against a rear wall of the slide 71. The roller on the end of the pin 70 is engaged by a cam surface 76 provided on the upper side of each gear segment 77.

This engagement of the cam surface 76 with the pin 70 causes the segmental gear 77 to be rocked in a clockwise direction, thus turning the nut 30 and causing the quill 24 to be moved down into sealing engagement with the top of the bottle 21. The tension of the springs 73 determines the degree of pressure exerted by the quill, since the operation referred to causes the slide 71 to be drawn outwardly against the spring pressure after the quill is seated until the roller 70 passes off the cam surface 76, the quill being meanwhile moved into sealing engagement with the bottle top. When the nut has passed the pin 70, the gear nut 30 will remain in its set position until turned in the reverse direction when approaching the take-out station as hereinafter explained.

When the operation of moving the quill into sealing engagement with the bottle has been effected, the roller 49 will pass off the end of the cam track 50, thus permitting the plunger 34 to be moved downwardly under the influence of the weights 38. The lower end of the plunger will thus enter the liquid-filled bottle 21, subjecting the liquid contents thereof to pressure determined by the weight of the plunger and the parts carried thereby. Succeeding testing units are similarly actuated as they pass station A, and the bottles being treated will remain under this testing pressure until they reach station C (Fig. 3). The table can be rotated at such rate or steps per minute, that each bottle will be subjected to testing pressure for approximately one minute.

As each unit leaves the station C, the roller 49 will ride up on the cam track 50, thus oscillating the cranks 44 and 43 to raise the yoke 46 against the underside of the gear wheel 37, and thereby raise the plunger 34 and the weights carried thereby to withdraw the plunger from the bottle. A cam-like tail portion 80 of the segmental gear 77 will be brought into engagement with a roller 81 that is carried on the underside of the bracket 72, thus causing oscillation of the segmental gear in a counter-clockwise direction and lifting movement of the quill 24, to release the bottle.

At station B, the operator will open the jaws 15 and 16 and remove the bottle. The duration of test will, of course, be determined by the rate of rotation of the table and the length of the cam track 50, it being understood that at the beginning of the testing when the roller 49 leaves the cam track, the liquid in the bottle will be subjected to the weight of the plunger 34 and the parts carried thereby, until the table has passed around to a point at which the roller will again engage the cam track, and be raised thereby.

Since each bottle is tested from an individual source of pressure, the breakage of one bottle will not affect tests on the other bottles, as would be the case if they were all tested simultaneously from a single pressure line. Also, the water or other testing liquid being practically non-compressible, there will be no "explosions" in case a bottle break occurs. Also, if for any reasons, the operator has failed to fill a bottle at the charging station, or a bottle breaks during its path of travel, the plunger 34 of that unit will move so far into the bottle that the operator can tell at a glance that an abnormal condition exists in that particular unit. To this end a flag or marker could be placed on the plunger at its upper end, or elsewhere.

In order to catch broken glass or cullet, I provide a catching bin or trough 86, which at its end adjacent to station A (Fig. 3) has a pair of inwardly swinging doors or gates 87 that will permit the depending body portion of the bottle to move into the trough. The trough extends around to a point intermediate the stations B and C, at which point the pressure is taken off the bottle. When the bottle reaches the station B, it has passed out of the trough, and the trough will not interfere with the removal of the bottle from the unit. The trough may be provided with suitable discharge spouts 88 that may lead to cullet bins or the like.

I claim as my invention:—

1. Apparatus for hydraulically-testing hollow articles, comprising a movable carrier for the articles to be tested, means on the carrier for confining liquid within an article, a displacement member on the carrier and movable into the confined liquid, and means operable through movement of the carrier, for operating the displacement member to effect pressure within the said article.

2. Apparatus for hydraulically-testing hollow articles, comprising a movable carrier for the articles to be tested, means on the carrier for confining liquid within an article, a displacement member on the carrier and movable into the confined liquid, means operable through movement of the carrier, for rendering the said confining means effective, and other means operable during said carrier movement, to project the displacement member into the confined liquid.

3. Apparatus for hydraulically-testing hollow articles, comprising a movable carrier for the articles to be tested, means on the carrier for confining liquid within an article, a displacement member on the carrier and movable into the confined liquid, and means operable through movement of the carrier, for operating the displacement member to effect pressure of a predetermined degree within the said article.

4. Apparatus for hydraulically-testing hollow articles, comprising a movable carrier for the articles to be tested, a plurality of article supports on the carrier, means at each support for confining liquid in an article, a displacement member at each support and movable into the confined liquid, and means operable through movement of the carrier, for operating the displacement members to effect pressure within the said articles.

5. Apparatus for hydraulically-testing hollow articles, comprising a movable carrier for the articles to be tested, a plurality of article supports on the carrier, means at each support for confining liquid in an article, a displacement member at each support and movable into the confined liquid, and means operable through movement of the carrier, for operating the displacement members to effect pressure within the said articles, under predetermined gravitational force.

6. Apparatus for hydraulically-testing hollow articles, comprising a movable carrier for the articles to be tested, a plurality of article supports on the carrier, means at each support for confining liquid in an article, a displacement member at each support and movable into the confined liquid, means operable through movement of the carrier for operating the displacement members to effect pressure within the said articles, and means operable to thereafter withdraw said members to inoperative position when the carrier has traveled a predetermined distance.

7. Apparatus for hydraulically-testing hollow articles, comprising a movable carrier for the articles to be tested, a plurality of article supports on the carrier, means at each support for confining liquid in an article, a displacement member at each support and movable into the confined liquid, means operable through movement of the carrier, to render the liquid-confining means effective, and means operable through said movement, to move the displacement member into the confined liquid.

8. Apparatus for hydraulically-testing hollow articles comprising a movable carrier for the articles to be tested a plurality of article supports on the carrier, means at each support for confining liquid in an article, a displacement member at each support and movable into the confined liquid, means operable through movement of the carrier to render the liquid-confining means effective, means operable through said movement to move the displacement member into the confined liquid, means thereafter operative to withdraw the displacement member, and means then operative to render the said confining means ineffective.

9. Apparatus for hydraulically-testing hollow articles comprising a movable carrier for the articles to be tested, a plurality of article supports on the carrier, means at each support for confining liquid in an article, a displacement member at each support and movable into the confined liquid, means operable through movement of the carrier to render the liquid-confining means effective, means operable through said movement to move the displacement member into the confined liquid, means thereafter operative to withdraw the displacement member, and means then operative to render the said confining means ineffective, the said withdrawal being effected when each displacement member and its associated article have traveled a predetermined distance.

10. Apparatus for testing hollow articles each containing a segregated body of liquid, comprising a movable carrier for the articles, sealing means for the mouth of each article, plungers movable through the sealing means and into the articles, means operable in timed relation to movement of the carrier for causing the plungers to enter the articles and remain there for a predetermined period, and means constantly urging the plungers toward the articles during said period, with a predetermined force.

11. Apparatus for testing hollow articles each containing a segregated body of liquid, comprising a movable carrier for the articles, sealing means for the mouth of each article, plungers movable through the sealing means and into the articles, means operable in timed relation to movement of the carrier for causing the plungers to enter the articles and remain there for a predetermined period, and weight elements constantly urging the plungers toward the articles during said period.

12. Apparatus for hydraulically-testing hollow articles, comprising a movable carrier for the articles to be tested, means on the carrier, periodically operable to effect sealing engagement with the mouths of the articles, for confining a body of liquid within each article, a displacement member on the carrier and movable against the confined liquid, and means operable through movement of the carrier, for operating the displacement member to effect pressure within the said article.

13. Apparatus for hydraulically-testing hollow articles, comprising a movable carrier for the articles to be tested, means on the carrier, periodically operable to effect sealing engagement with the mouths of the articles, for confining a body of liquid within each article, a displacement member on the carrier and movable against the confined liquid, and means operable during movement of the carrier through a predetermined distance, for operating the displacement member to maintain a predetermined pressure within the said article.

FRANK W. PRESTON.